United States Patent
Dastrup et al.

(10) Patent No.: US 7,027,812 B2
(45) Date of Patent: Apr. 11, 2006

(54) CHANNEL SELECTION IN AIRCRAFT COMMUNICATIONS SYSTEM BY DETERMINING ZONE LOAD AND SELECTING ALTERNATE CARRIER

(75) Inventors: Therin L. Dastrup, Scottdsale, AZ (US); Mark A. Vollmer, Glendale, AZ (US); Charles C. Manberg, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 531 days.

(21) Appl. No.: 09/863,541

(22) Filed: May 22, 2001

(65) Prior Publication Data

US 2002/0009993 A1 Jan. 24, 2002

Related U.S. Application Data

(60) Provisional application No. 60/215,963, filed on Jul. 5, 2000.

(51) Int. Cl.
*H04Q 7/20* (2006.01)

(52) U.S. Cl. .................. 455/431; 455/427; 455/445; 455/453

(58) Field of Classification Search ............. 455/431, 455/427, 428, 429, 430, 445, 453, 13.1–13.4, 455/12.1

See application file for complete search history.

(56) References Cited

U.S. PATENT DOCUMENTS

| | | | | |
|---|---|---|---|---|
| 6,282,417 B1 * | 8/2001 | Ward | ................. | 455/431 |
| 6,408,180 B1 * | 6/2002 | McKenna et al. | .......... | 455/431 |
| 6,430,412 B1 * | 8/2002 | Hogg et al. | ................. | 455/436 |
| 6,721,559 B1 * | 4/2004 | Kocin et al. | ................. | 455/431 |

FOREIGN PATENT DOCUMENTS

FR    2 787 658 A    6/2000

* cited by examiner

*Primary Examiner*—Edan Orgad
(74) *Attorney, Agent, or Firm*—Honeywell Int'l Inc.

(57) ABSTRACT

An apparatus, method and computer program product that utilizes user defined channel and frequency preferences to effect airborne voice and data telecommunications.

26 Claims, 5 Drawing Sheets

```
        1 2 3 4 5 6 7 8 9 10 11 12 13 14 15 16 17 18 19 20 21 22 23 24
       ┌─────────────────────────────────────────────────────────────┐
       │   CMU              DATA COMM                       1/2      │
  1L   │  *CONUS                                    N. PACIFIC*      │  1R
       │                                                             │
  2L   │  *EUROPE                                   S. PACIFIC*      │  2R
       │                                                             │
  3L   │  *AUSTRALIA < * >                          N. ATLANTIC*     │  3R
       │                                                             │
  4L   │  *AFRICA                                   S. ATLANTIC*     │  4R
       │    RETURN TO                                                │
  5L   │  *AUTO                                         OTHER*       │  5R
       │                                                             │
  6L   │  <RETURN                                    VHF FREQ>       │  6R
       └─────────────────────────────────────────────────────────────┘
        1 2 3 4 5 6 7 8 9 10 11 12 13 14 15 16 17 18 19 20 21 22 23 24
```

400

CHANNEL SELECTION IN AIRCRAFT COMMUNICATIONS SYSTEM BY DETERMINING ZONE LOAD AND SELECTING ALTERNATE CARRIER

CROSS-REFERENCES TO RELATED APPLICATIONS

This application claims priority from co-pending U.S. application Ser. No. 60/215,963 titled: "DATALINK PREFERRED CHANNEL SELECTION" filed on Jul. 5, 2000, the entire contents of which are hereby incorporated by reference.

BACKGROUND OF THE INVENTION

Most aircraft that use datalinking/messaging equipment such as, for example, the Airborne Communications Addressing and Reporting System (ACARS) Management Unit (MU) or Communications Management Unit (CMU) systems have arrangements with more than one datalink service provider to provide the digital communication link between the ground host computer and the datalink system on board the aircraft. These service providers operate over several subnetworks, utilizing VHF, HF, and SATCOM links. Furthermore, each service provider typically operates on different VHF frequencies in different parts of the world.

The various service providers have different cost structures and different incentives to entice the aircraft owner/operators to utilize their services. As datalink and messaging services become more prevalent, the airlines are spending ever increasing amounts on these services, and are looking for ways to control costs. The system users also require that the datalink system provide an adequate and reliable means of establishing communications no matter where they are located on the globe.

A number of systems have been developed to optimize airline datalink costs, but each has drawbacks. In one such earlier system, regions were defined that incorporated a single longitude and latitude reference point to define a rectangular region. This earlier system limited flexibility in choosing among multiple providers with non-rectangular service boundaries. In addition, earlier systems were restricted to defining preferred VHF frequencies, and did not consider a regional preference for other subnetworks, such as HF, SATCOM and future subnetworks. Earlier systems also did not consider aircraft location or subnetwork preferences in the VHF frequency selection process. Each of the above limitations reduced the efficiency of the datalink/messaging system, resulting in non-optimum service choices.

SUMMARY OF THE INVENTION

The present invention recognizes the problems of the prior art. According to one aspect of the present invention, the invention provides a method that selects the preferred channel, e.g. SATCOM, HF or VHF frequencies for communications, based on a user-defined database of channel preferences. Unlike the prior art methods, the present invention permits greater specificity in the selection process. For example, while the prior art permits only a single order ranking of channel preferences, e.g. 1=SATCOM, 2=VHF, 3=HF in a given region; the present invention can dynamically order preferences based on current communication status or conditions. According to the present invention, the user may therefore specify, for example, that SATCOM is preferred over VHF when VHF frequency #1 is not available. Such a hierarchy is not permitted by the prior art.

According to another aspect of the present invention, the database defines the boundaries of various regions of the world, further subdivided into a collection of smaller areas. The present invention therefore allows a finer granularity for region definition than the simple longitude/latitude coordinate definition of the prior art and additionally permits use of nonrectangular regions.

The database of the present invention also includes the subnetworks and VHF frequencies, in order of user preference, that are to be used to establish datalink communications in the corresponding region. The present invention uses this information to select the most desirable channel for datalink communications. The present invention thus permits the user to select the most economical and/or most robust datalink service provider and channel, no matter where in the world the aircraft is currently located.

DESCRIPTION OF PREFERRED EMBODIMENTS

System Overview

The present invention includes an apparatus, method and computer program product for defining and selecting the preferred channel for airborne communications, such as for example, in a Communications Management Unit (CMU) or ACARS Management Unit (MU). The invention permits the user to choose a preferred air/ground subnetwork and/or a preferred VHF frequency based on aircraft position. These preferences may be defined by the user in a loadable database or Airline Modifiable Information (AMI) and loaded into the CMU/MU for operation.

Figure 1:
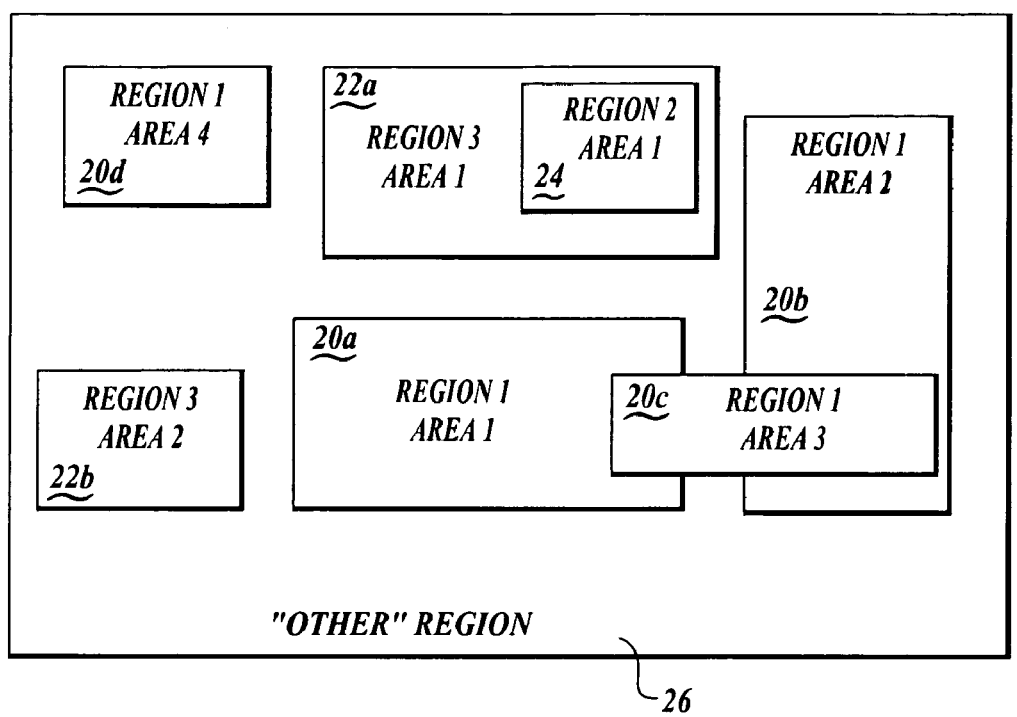
FIG. 1 illustrates the organization of regions and areas according to the preferred embodiment of the invention.

The CMU AMI or loadable database defines a system of regions for every place on the globe where communications/datalink preferences are desired. A region called OTHER defines preferences for locations outside those defined regions. The region, or service volume, may comprise a projection on to a flat map or may optionally be defined as including a height above ground dimension. Regions need not be rectangular in shape. To further improve the granularity in the definition of these regions, each region may comprise one or more areas. Areas are subsets of the region which are bounded by top and bottom latitude lines and left and right longitude lines. In one embodiment of the invention, when viewed on a traditional flat map, each area would appear as a rectangle. The areas that comprise a particular region do not necessarily have to be contiguous. Different regions are allowed to overlap each other, just as coverage of different service providers overlap. FIG. 1 illustrates an exemplary embodiment of a system of regions 20 and 22 subdivided into areas 20a–20d and 22a–22b respectively. A region 24 can be entirely contained within a region. An OTHER region 26 defines the region not encompassing regions 22 and 24.

In a preferred embodiment of the invention, up to 20 regions can be defined in the AMI/loadable database. Each region is defined by a region number, a region name, and up to N areas. In a preferred embodiment of the invention, N=10. The region names are used for the crew interface, and are preferably each up to nine characters long. The nine character width allows room for a selection prompt to indicate the selected region when the region names are displayed on a display screen such as the Multi-Purpose Control Display Unit (MCDU). A region name and crew interface are not, however, required to be included in the invention.

Figure 2A:
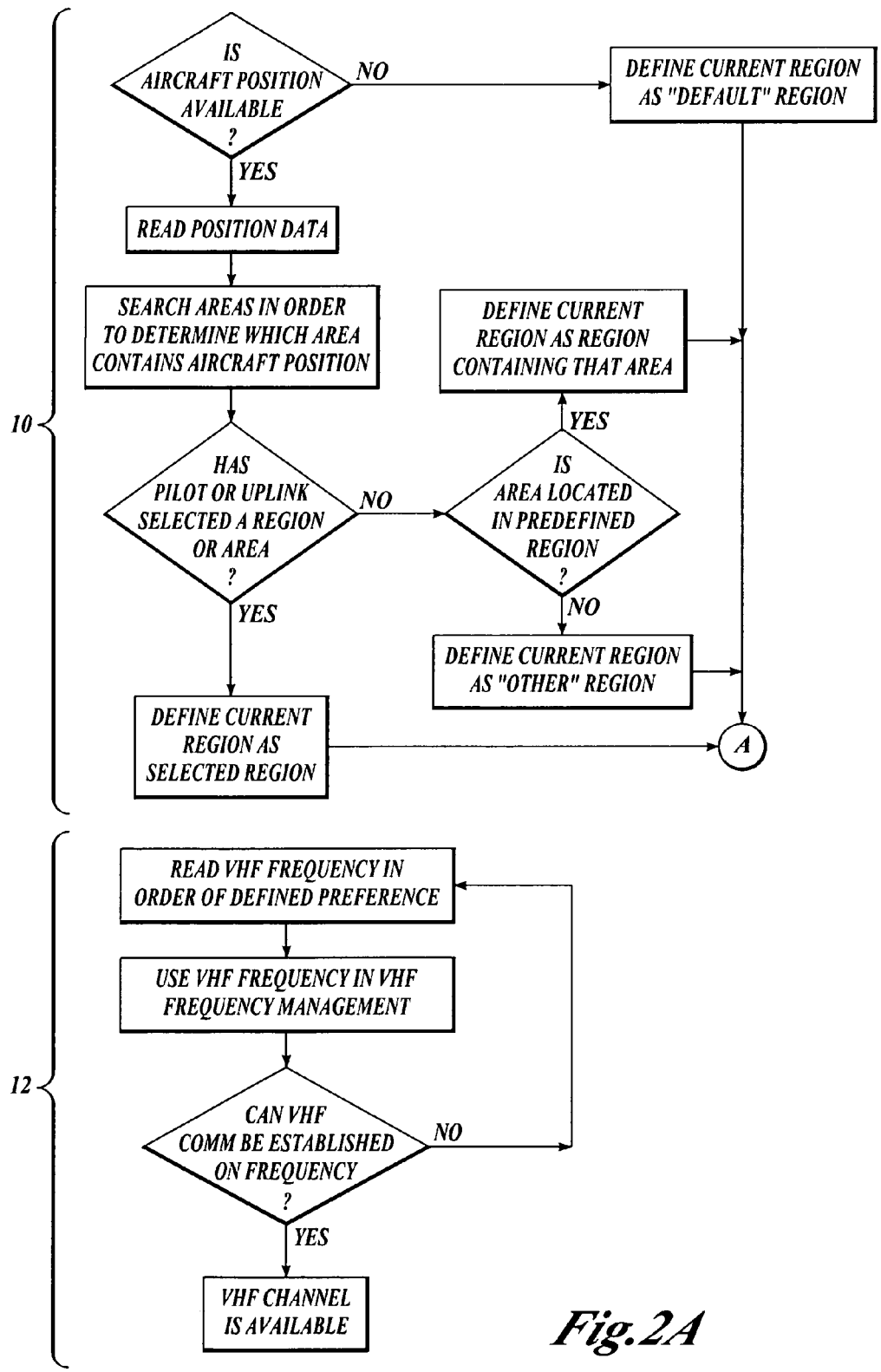
FIG. 2 is a flow chart of a process for selecting a preferred communications channel according to a preferred embodiment of the present invention.
Figure 2B:
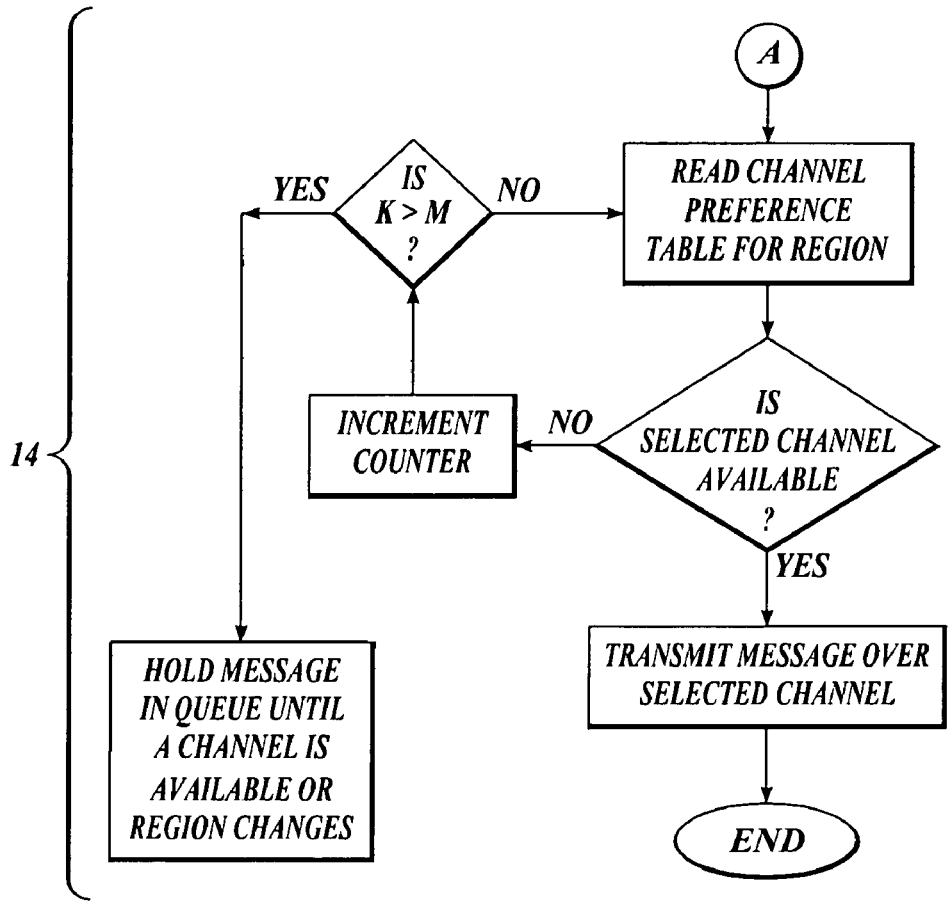

FIG. 2 outlines a process useful for selecting a preferred communications channel according to a preferred embodiment of the invention. The process of FIG. 2 involves three basic tasks to be described in greater detail below. The first task 10 determines the region in which the aircraft is operating. The second task 12 selects the preferred VHF frequencies for that region, according to a predefined logic that examines an ordered list of preferences. The third task 14 examines the availability of the preferred channels selected for the region, and determines which available channel is the most preferred for datalink communications. The channel/selection of task 14 can account for the availability of VHF frequencies in the ordering of channel preferences. The process of FIG. 2 easily supports the addition of new channels or subnetworks by defining new subnetwork codes in the preference tables. The present invention is not, however, limited to the process order of FIG. 2. The preferred channel could first be selected, followed by the preferred VHF frequency when VHF is selected.

In a preferred embodiment of the invention, three user-defined tables are associated with each of these three tasks. These tables include: the Region Boundary Table, the VHF Data Frequency Table, and the Channel Preference Table. Preferably, these tables are defined in the CMU AMI or other loadable database or PCMCIA card. Although described as three different tables, these tables could optionally be implemented as one single table or optionally, as logic.

Each entry in the Region Boundary Table comprises the following elements:
  Region Number (1 byte)
  Region Name (9 bytes)
  Number of Areas (1 byte)
  Area 1 boundaries
  Area 2 boundaries
  Area N boundaries Each of area boundaries $A_1$ through $A_N$ comprises 4 words, including:
  Latitude A: The upper or northern boundary of the area.
  Latitude B: The lower or southern boundary of the area.
  Longitude A: The left or western boundary of the area.
  Longitude B: The right or eastern boundary of the area.

When the current position of the aircraft, e.g. latitude and longitude, is available, the current region is determined by evaluating the areas of each region, in the order that they are defined in the Region Boundary Table, until the area containing the current position is determined. This allows the creation of an "island" region of higher priority than the region that contains it. Once the area is determined, the current region is then defined as the region containing that area.

Once the region has been identified, the region determination logic continues to verify that the aircraft is located within that region. In a preferred embodiment of the invention, the aircraft current position is updated and the current region verified every minute.

In a preferred embodiment of the invention, a VHF Frequency Table and a Channel Preference Table are associated with each of the defined regions and areas. The VHF Frequency and Channel Preference Tables enable the user to specify which communication channels, subnetworks, service providers and/or frequencies should preferably be used in that region. In this way, the user can select the preferred channels/networks and/or frequencies for the desired combination of performance and economy.

The entire world need not be subdivided into defined regions. A typical user, for example, may only identify a handful of regions. Parts of the world not contained within a predefined region are placed within a region known as the OTHER region. The OTHER region is any place in the world other than the predefined regions. When current aircraft position is known, but not found within any of the defined regions, the current position is in the OTHER region. There is no Region Boundary Table associated with the OTHER region. The user may define a VHF Data Frequency Table and a Channel Preference Table for the OTHER region which gives the user the ability to set frequencies and channel preferences for locations outside the defined regions.

The OTHER region table can also be dynamically changed by the user. Uplink messages, logic units, and data entry pages can be created by the user and defined by the AMI, loadable database, PCMCIA card or other readable media to dynamically modify the VHF Data Frequency Table and Channel Preference Table for the OTHER region. According to a preferred embodiment of the invention, once the OTHER region tables are uplinked or otherwise loaded, they remain loaded until a power-up or reset restores them to the AMI-defined values. When the user uplinks or otherwise commands the selection of the OTHER region, the automatic region determination will be inhibited, and the OTHER region table will be used until the automatic determination is re-enabled.

The DEFAULT region is the entire world whenever the aircraft position is unknown. There is no Region Boundary Table associated with the DEFAULT region. In some aircraft, the position of the aircraft will not be input to the CMU. Furthermore, on aircraft that do feed position data to the CMU, certain system failures can prevent the CMU from receiving and/or determining current position. If there is no valid position data, then the aircraft could be anywhere in the world and thus the preferences defined by the DEFAULT region are used. A separate VHF Data Frequency Table and Channel Preference Table is defined in the AMI/loadable database for the DEFAULT region. Defining preferences for the DEFAULT region provides the user with the ability to set frequencies and channel preferences to be used worldwide, whenever the current position is unknown.

The current region selection can be changed by an uplinked command or by manual selection initiated by the crew. According to one embodiment of the invention, manual selection may be optionally disabled by the AMI. All of the defined regions, plus the OTHER region are selectable, but the DEFAULT region is preferably not a selectable region. If the region is switched by uplink command to another region, or the crew manually selects a different region on the Data Comm page of the display, then the automatic region determination, for example, 1 is inhibited until one of the following events occurs:
 a) A System Reset;
 b) A power up; or
 c) "AUTO" is selected on the Data Comm page.

VHF Data Frequency Table

A VHF Data Frequency Table is associated with each region. A single VHF Data Frequency Table is associated with the OTHER region and a second VHF Data Frequency Table is associated with the DEFAULT region. In one possible embodiment of the invention, the maximum number of frequencies specified in each region depends on the type of region. For example:
 Up to 2 frequencies for each user-defined region;
 Up to 6 frequencies for the OTHER region; and
 Up to 10 frequencies for the DEFAULT region.

Each entry in the VHF Data Frequency Table includes the following elements:
 VHF_Freq_1 (32-bit integer)
 VHF_Freq_2 (32-bit integer)
 VHF_Freq_3 (32-bit integer)—Other/Default/Dynamic Regions only
 VHF_Freq_4 (32-bit integer)—Other/Default/Dynamic Regions only
 VHF_Freq_n (32-bit integer)—Other/Default/Dynamic Regions only If fewer than the maximum number of VHF frequencies are desired for a region, the unused frequencies are preferably set to zero, indicating that they should be skipped in the frequency scanning process.

When the process of the present invention enters step 12, a frequency is selected from the frequency table for use in that region. The aircraft transmitter/receiver is then tuned to VHF_Freq_1 from that table. If VHF communications on VHF_Freq_1 cannot be established, the present invention tunes to the aircraft transmitter/receiver to VHF_Freq_2. Frequency scanning continues in a similar manner sequentially through the list of frequencies, until communications on a VHF frequency have been established. If communications cannot be established on any of the frequencies in the table, frequency scanning can continue in round-robin fashion, until a frequency is found, or until a new region has been selected or entered.

When operating in a user-defined region, typically the user is confident that communications are possible on the defined channels and no need exists to listen for a valid uplink on the preferred VHF frequency before attempting communications. When operating in the OTHER or DEFAULT regions, however, a first scan time can be used for the first two passes of the Frequency Table to quickly establish a communications link. A second, slower scan time can be utilized for subsequent passes of the Frequency Table.

The frequency selection made by the scanning process can be overridden manually by the crew. Once the crew has manually selected a frequency, the selected VHF frequency remains in use until one of the following occurs:
 a) A new frequency is manually selected;
 b) A secondary frequency is manually entered;
 c) An autotune frequency is uplinked; or
 d) The VHF Frequency Management algorithm re-enters the Acquisition State.

Channel Selection

Channel preference refers to the subnetwork and/or VHF data frequency that is preferred in a given region. The Channel Preference Table defines the order of preference for subnetwork selection and/or VHF data frequencies. One Channel Preference Table is associated with each region. The channel preference table can account for variations in channel preferences based on which VHF frequency is presently tuned.

Each entry in the Channel Preference Table includes the following elements:
 Region Number (1 byte)—optional if region number is used as an index.
 Preference_1 (1 word)
 Preference_2 (1 word)
 Preference_3 (1 word)
 Preference_4 (1 word)
 Preference_5 (1 word)
 Preference_M (1 word)

Each preference is a one word channel code representing SAT, HF, VHF, VHF-1, VHF-2, VHF-3, VHF-N, or NONE. The codes for VHF, SAT, and HF represent a preference for a specific subnetwork, without regard to a specific frequency. The codes for VHF-1, VHF-2, VHF-3, VHF-N represent a preference for a specific entry in the VHF Frequency Table corresponding to the same region. Preferably, each code, except NONE, is used in no more than one of the preference slots for a given region. The code for NONE can be used for any, or all, of the preferences, but if NONE is used for one preference, it must also be used for all of the lower preferences for that region. For example, the following illustrates a five region Channel Preference Table:
 Region 1: VHF-1, SAT, VHF-2, HF, VHF-3, VHF-4.
 Region 2: SAT, VHF-1, HF, NONE, NONE, NONE.
 Region 3: HF, SAT, VHF, NONE, NONE, NONE.
 Region 4: VHF, SAT, NONE, NONE, NONE, NONE.
 Region 5: NONE, NONE, NONE, NONE, NONE, NONE. (No datalink allowed here)

In the above example, transmitting a downlink message while operating in Region 2, preference will be given to the SATCOM channel indicated by the code found in Preference_1, followed by the VHF channel indicated by the VHF-1 code found in Preference_2, and then the HF channel indicated by the HF code in Preference_3.

Figure 3:
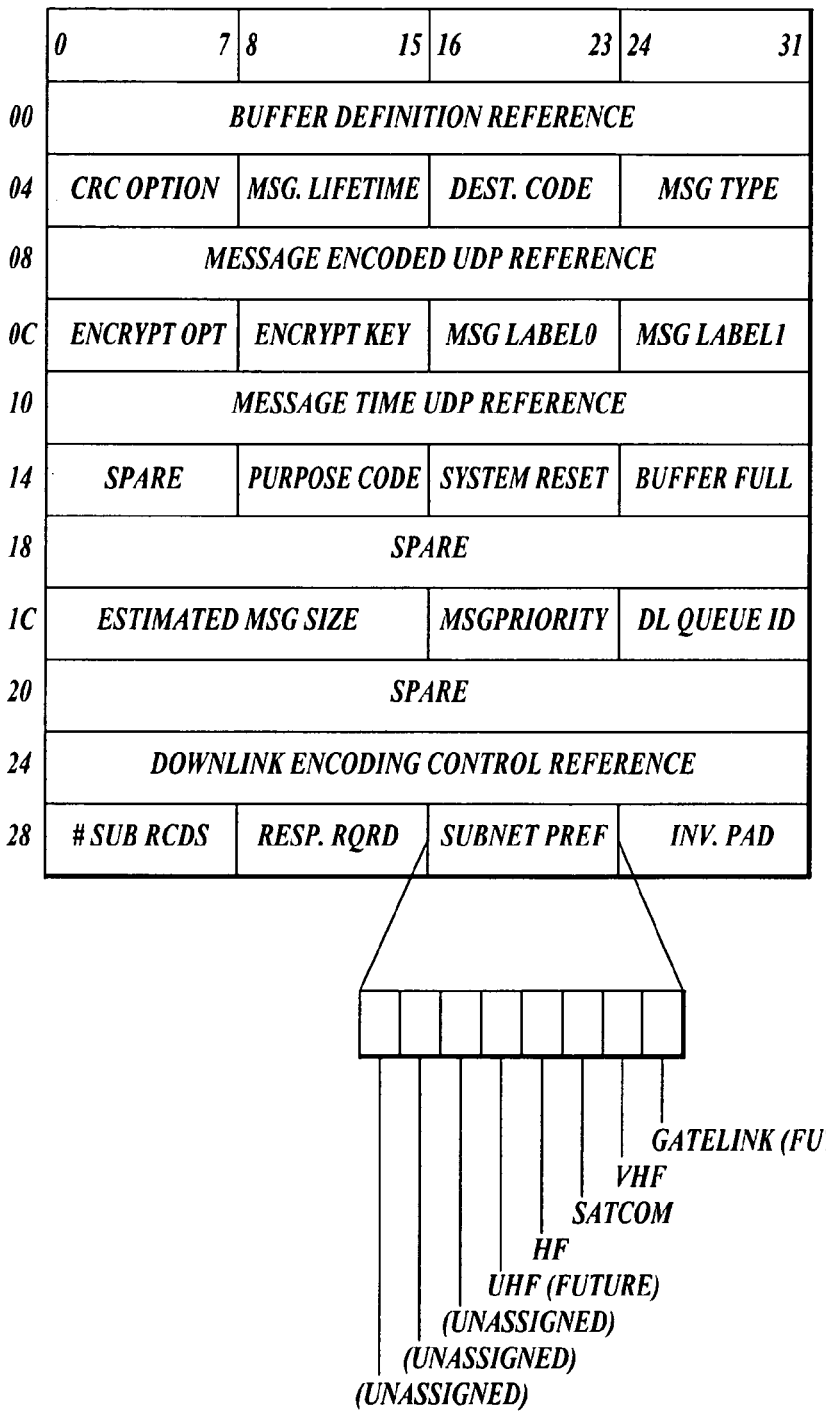
FIG. 3 is an illustration of a data structure layout for a message definition.

Each message transmitted from the aircraft is typically encoded to indicate on which channels; VHF, HF, SATCOM, the message may be sent. One such message format is shown in FIG. 3. If the channel preference indicates VHF, then the message will be sent via VHF if the message is enabled for VHF transmission and the VHF link is available (i.e. in the Frequency Maintenance State) as defined ARINC specification 618, *The Air/Ground Character Oriented Protocol Specification,* for ACARS communications and incorporated by reference herein. The availability of VHF communications is preferably determined through use of a transmitted link test message which has been transmitted and acknowledged. Use of link test messages is well known to those of skill in the art. Optionally, the VHF frequency may be considered unavailable if a high channel occupancy exists (e.g. no available transmit slot exists for 60 seconds), or if channel utilization exceeds a predetermined threshold, e.g. 70%. If the code indicates VHF-n, then the message will be sent via VHF if the message is enabled for VHF transmission, and the VHF link is available and the current primary frequency is the nth frequency in the VHF frequency table. Note that when tuned to a secondary frequency, the last primary frequency is remembered. In that case, the message will be sent via VHF if the entry number of the last primary frequency matches the preferred VHF frequency number (VHF-n).

If the preference code indicates SAT, then the message will be sent via SATCOM if the message is enabled for SATCOM transmission and the SATCOM link is available. The availability of the SATCOM link is determined by the satellite data unit which transmits a bit to indicate that the link is available.

If the preference code indicates HF, then the message will be sent via HF if the message is enabled for HF transmission and the HF link is available. The availability of HF communications is determined by the current value of a status bit received from each of the HF communications system.

Unlike the VHF system, the SATCOM and HF systems cannot typically be controlled directly by the present invention. The preferred embodiment of the invention checks the current availability of the SATCOM and/or HF systems and utilizes the frequencies to which those systems have been tuned. Optionally, however, control of the SATCOM and/or HF systems can be accomplished by the present invention in a manner similar to that described in connection with use of the VHF communications system.

If none of the above criteria are met for the current channel preference, then the channel code for the next preference is examined and the same criteria applied to determine whether the message can be transmitted on the next preferred channel. This process repeats for all M preferences, until a channel is found that permits the message to be transmitted. If the next preference code indicates NONE, then the preference choices will be considered exhausted. Once the appropriate channel is selected for transmitting a message, attempts will be made to send the message on that channel. If the message fails to transmit, no message acknowledgment will be received and the message will be routed to the available subnetwork with the highest preference.

If all preferences have been exhausted without achieving a successful transmission of the message, then the message will remain in queue, until a channel becomes available. The message can then be transmitted using that channel.

System Configuration

Figures 4, 5:
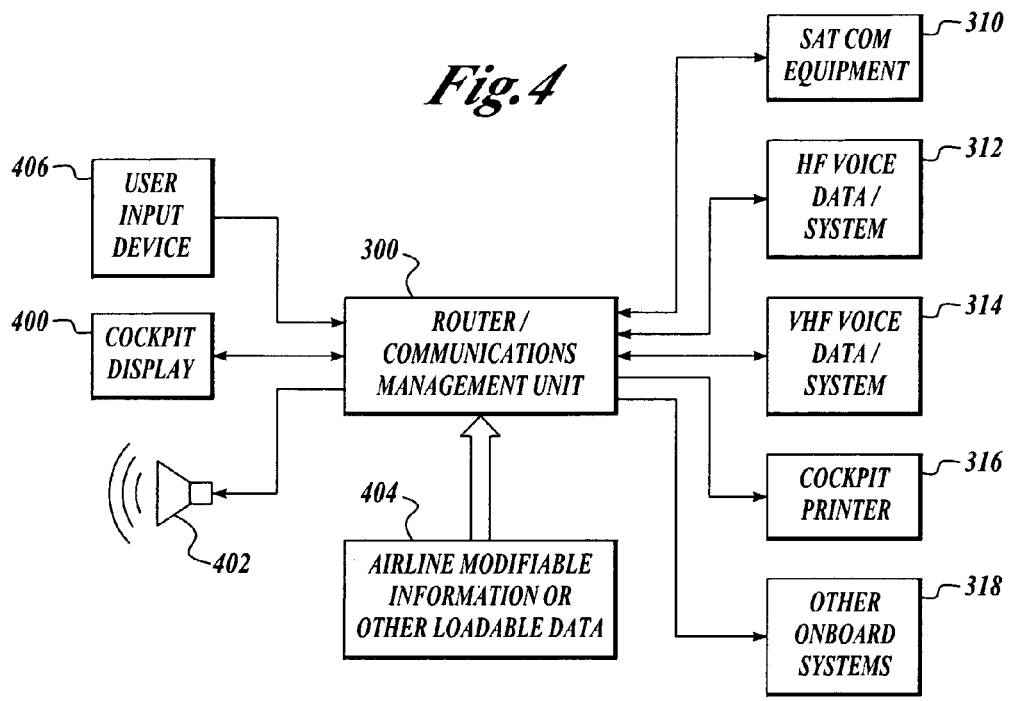
FIG. 4 is a block diagram of system hardware useful for implementing a preferred embodiment of the present invention.
FIG. 5 illustrates a crew interface suitable for use with the present invention.

FIG. 4 illustrates a block diagram of system hardware useful for implementing the present invention. A CMU or other communications management/router device 300 directs messages to the various on board communications systems 310–314 for transmission from the airplane. The on board communications systems may include, but are not limited to a SATCOM system 310, a HF Voice/Data communications system 312, a VHF voice/data system 314. Systems 310, 312 and 314 are well known to those of ordinary skill in the art. The present invention, is not however, so limited and other aircraft voice/telecommunications systems may be used with the present invention.

Router 300 also controls the routing of messages received on systems 310, 312 and 314 to the appropriate on board device. These devices may include, but are not limited to: a cockpit printer 316 useful for printing text messages received by one of systems 310, 312 or 314; other on board systems 318, or a cockpit display 400 or a speaker 402. On board systems 318 may include weather data systems, flight management computer systems, and/or seatback telecommunications and data services.

Which VHF frequency and which of systems 310, 312 and 314 are utilized for aircraft communications is controlled by router 300 according to the present invention. According to a preferred embodiment of the present invention, router 300 includes the present invention in the form of software, executable code, firmware, electronic circuit, analog circuit, programmable logic device, and/or a PCMCIA card or other computer readable media. In a preferred embodiment of the invention, the various region, frequency and channel preference tables may be loaded into router 300 via the AMI or other loadable database 404. Items loaded through block 404 may optionally be uplinked to router 300 via any of the data communications systems 310, 312 and/or 314. A user interface 406 may be used in lieu of, or in addition to database 404 or data uplink, to load the present invention and/or the associated frequency, channel preference or region tables, into router 300. User interface 406 may comprise a computer such as a laptop computer or personal computer, or a cockpit keypad. User interface 406 additionally enables manual selection of a region or area; or selection of a discrete frequency or channel. User interface 406 may therefore be used to override the channel/region/frequency selection made by the present invention.

Display 400 may additionally be used to display current region/frequency/channel selection to the crew and to enable manual selection of same.

FIG. 5 illustrates an exemplary embodiment of a data communications display 400. The currently selected region will be indicated on the data communications display page, by the presence of a <SEL> prompt adjacent to the selected region. The prompt will update automatically when the region is changed by any means. The crew can manually select any of the defined regions, overriding the automatic region determination logic. In the embodiment of FIG. 5, pressing side key numbers 1–4L & 1–4R causes the region determination logic to be inhibited, and forces the region selection to the region indicated or display 400. In a possible embodiment of the invention, this process can be disabled via the AMI. Key number 5L (AUTO) re-enables the automatic region determination logic when a manual selection has been performed. The header line above the AUTO key will indicate "RETURN TO" whenever a manual selection has been made. Key number 5L is blank when operating automatically. In an optional embodiment of the invention, if a no communications condition occurs while the automatic region determination has been overridden by a manual selection, a scratchpad advisory such as: "Check Region Selection," can be displayed on display 400 to alert the crew as to the possible source of the no communications condition. Activating side key 5R (OTHER) selects the OTHER region, and also inhibits the automatic region determination logic. Activating side key 6R (VHF FREQ) displays the VHF Frequency page, containing the frequency table for the currently selected region.

Illustrative Example

The following illustrative example describes operation of the present invention. A datalink message for transmission from the aircraft is enabled for transmission using either the VHF, or SATCOM communications systems. The message is not enabled for transmission using the HF communications system. The example datalink message is a request for uplinked weather data.

In step 10 of FIG. 2, the present invention determines that the aircraft is presently located in Area A of Region 2. In step 12 of FIG. 2, the VHF frequency preferences are read from the VHF frequency data table. The invention continually operates to identify and maintain a VHF communications link on one of the preferred VHF frequencies defined in the table. Having failed to receive a valid datalink message on VHF frequency 1 or VHF frequency 2, the VHF communications system is tuned to VHF frequency 3 where a valid datalink message is received. The current VHF frequency is therefore identified as VHF frequency 3.

The present invention then checks the preferred channel selection for the current region/area using the preferred channel selection table associated with that region/area and as described in step 14 of FIG. 2. In the present example, the channel preference table indicates that when VHF frequency 3 is the active frequency in this region, the channel preference is: HF, SATCOM, VHF. The example message is not, however, enabled for HF transmission. Therefore, transmission of the message will first be attempted by the present invention using the SATCOM system.

Preferred embodiments of the present invention have now been described. Variations and modifications will be readily apparent to those of ordinary skill in the art. For this reason, the invention is to be interpreted in view of the claims.

What is claimed is:

1. A method for aircraft telecommunications comprising the steps of:
   identifying a current service volume within an ATC sector;
   identifying an available VHF communications channel frequency from a table of preferred VHF communications frequencies associated with said current service volume;
   selecting a preferred communications attribute from a table of attributes associated with said current service volume and according to said available VHF communications channel frequency; and
   effecting airborne communications utilizing said preferred communications attribute.

2. The method of claim 1 wherein said predefined service volumes comprise geographic regions other than rectangular regions.

3. The method of claim 1 wherein said service volumes further include at least one subset of area.

4. The method of claim 1 wherein said step of selecting a preferred communications attribute includes the step of selecting a VHF communications channel.

5. The method of claim 1 wherein said step of selecting a preferred communications attribute includes the step of selecting a SATCOM communications channel.

6. The method of claim 1 wherein said step of selecting a preferred communications attribute includes the step of selecting an HF communications channel.

7. The method of claim 1 further comprising the step of manually selecting a second preferred communications attribute different than said preferred communications attribute.

8. The method of claim 1 wherein said step of identifying a current service volume further comprises the steps of:
   determining a current aircraft position; and
   comparing said current aircraft position with a set of predefined service volumes to identify the current service volume encompassing said current aircraft position.

9. A method for aircraft telecommunications comprising the steps of:
   defining a plurality of service volumes within an ATC Sector;
   associating a set of preferred communications attributes with each of said plurality of service volumes;
   identifying a current service volume;
   selecting a preferred communications attribute from said set of preferred communications attributes associated with said current service volume; and
   effecting airborne communications utilizing said preferred communications attribute.

10. The method of aircraft telecommunications of claim 9 wherein said step of selecting a preferred communications attribute further comprises the step of selecting a preferred communications channel.

11. The method of aircraft telecommunications of claim 9 wherein said step of defining a plurality of service volumes further comprises the step of defining at least one area located within at least one service volume.

12. The method of aircraft telecommunications of claim 9 wherein said step of identifying a current service volume comprises the step of identifying a current position of the aircraft.

13. A computer program product for use on an aircraft, the computer program product comprising:
   a computer readable storage medium having computer readable program code means embodied in said medium, said computer readable program code means comprising:
   a first computer instruction means for identifying a current service volume within an ATC sector to be used for airborne communications;
   a second computer instruction means for identifying an available VHF communications channel frequency from a table of preferred VHF communications frequencies associated with said current service volume;
   a third computer instruction for selecting a preferred communications attribute from a table of attributes associated with said current service volume and according to said available VHF communications channel frequency; and
   a fourth computer instruction means for effecting airborne communications utilizing said preferred communications attribute.

14. The computer program product of claim 13 wherein said first computer instruction means further includes a fifth computer instruction means for reading a current position of the aircraft.

15. The computer program product of claim 13 wherein said fourth computer instruction means selects a preferred communications channel.

16. The computer program product of claim 13 wherein said first computer instruction means further includes a fifth computer instruction means for identifying a current service area located within said current service volume.

17. A communications apparatus for effecting airborne communications comprising:
   an input for receiving a message to be transmitted from an aircraft;
   a logic device for selecting a preferred communications attribute to be utilized in transmitting said message as a function of: an identified service volume within an ATC sector; and a VHF channel frequency preference, the preference based upon a table of VHF communication channel frequencies associated with the service volume, the selecting being based upon a table of attributes associated with the service volume; and
   a router for effecting airborne communications according to said preferred communications attribute.

18. The communications apparatus of claim 17 wherein said logic device comprises a computer readable medium.

19. The communications apparatus of claim 18 wherein said computer readable medium comprises a PCMCIA card.

20. The communications apparatus of claim 17 wherein said logic device comprises a programmable logic device.

21. The communications apparatus of claim 17 wherein said input is coupled to receive a position information of the aircraft and wherein said preferred communications attribute is determined according to said position information.

22. The communications apparatus of claim 17 further comprising a controller useful for controlling display of communications information on a cockpit display.

23. The communications apparatus of claim 17 wherein said apparatus comprises a CMU.

24. The communications apparatus of claim 17 wherein said apparatus comprises an Air Traffic Service Unit (ATSU).

25. The communications apparatus of claim 17 wherein said apparatus comprises a Data Management Unit (DMU).

26. The communications apparatus of claim 17 wherein said apparatus comprises an Airborne Communications Addressing and Reporting System (ACARS) Management Unit.

* * * * *